(12) United States Patent
Xu et al.

(10) Patent No.: US 10,701,726 B2
(45) Date of Patent: Jun. 30, 2020

(54) METHOD AND APPARATUS FOR SENDING V2X SERVICE, AND METHOD AND APPARATUS FOR CONFIGURING RESOURCES

(71) Applicant: ZTE CORPORATION, Shenzhen, Guangdong (CN)

(72) Inventors: Hui Xu, Shenzhen (CN); Zijiang Ma, Shenzhen (CN); Yong Lv, Shenzhen (CN); Chen Lu, Shenzhen (CN); Yutang Xie, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 199 days.

(21) Appl. No.: 15/762,802

(22) PCT Filed: Jun. 27, 2016

(86) PCT No.: PCT/CN2016/087245
§ 371 (c)(1),
(2) Date: May 7, 2018

(87) PCT Pub. No.: WO2017/049976
PCT Pub. Date: Mar. 30, 2017

(65) Prior Publication Data
US 2018/0263052 A1 Sep. 13, 2018

(30) Foreign Application Priority Data
Sep. 24, 2015 (CN) .......................... 2015 1 0618844

(51) Int. Cl.
*H04W 72/12* (2009.01)
*H04W 72/04* (2009.01)
(Continued)

(52) U.S. Cl.
CPC ........ *H04W 72/1294* (2013.01); *H04Q 11/02* (2013.01); *H04W 4/40* (2018.02); *H04W 72/04* (2013.01); *H04W 72/0446* (2013.01)

(58) Field of Classification Search
CPC ... H04W 72/1294; H04W 72/04; H04W 4/40; H04W 72/0446; H04Q 11/02
See application file for complete search history.

(56) References Cited

U.S. PATENT DOCUMENTS

2014/0051346 A1* 2/2014 Li .......................... H04W 4/046
455/3.01
2015/0334721 A1* 11/2015 Kim .................... H04W 72/085
370/330
(Continued)

FOREIGN PATENT DOCUMENTS

| CN | 103209487 A | 7/2013 |
|---|---|---|
| CN | 103812605 A | 5/2014 |

(Continued)

OTHER PUBLICATIONS

International Search Report and Written Opinion for International Appl. No. PCT/CN2016/087245, dated Sep. 21, 2016.
(Continued)

*Primary Examiner* — Ajay Cattungal
(74) *Attorney, Agent, or Firm* — Foley & Lardner LLP (57) ABSTRACT

Provided are method and apparatus for sending V2X service, and method and apparatus for configuring resources. The method for sending V2X service includes that a first OBU acquires sending resources for sending a V2X service, where the sending resources include resources required for sending V2X service data and scheduling information of the V2X service, the scheduling information is used for specifying information required for resource scheduling for the V2X service data; and the first OBU sends, on the sending resources, the scheduling information and the V2X service
(Continued)

data to a second OBU. Frequency-domain multiplexing is performed in a same subframe in the sending resources for scheduling information and the V2X service data, and the scheduling information specifies that resource configuration is performed, in same and/or different subframes, for the V2X service data.

17 Claims, 6 Drawing Sheets

(51) Int. Cl.
*H04W 4/40* (2018.01)
*H04Q 11/02* (2006.01)

(56) References Cited

U.S. PATENT DOCUMENTS

| | | | | |
|---|---|---|---|---|
| 2016/0119151 A1* | 4/2016 | Park | ................ | H04L 9/006 713/158 |
| 2018/0139593 A1* | 5/2018 | Chun | ................ | H04W 4/12 |
| 2018/0184270 A1* | 6/2018 | Chun | ................ | H04W 76/14 |
| 2018/0191551 A1* | 7/2018 | Chun | ................ | H04W 76/20 |
| 2018/0213365 A1* | 7/2018 | Yi | ................ | H04W 4/06 |
| 2018/0213446 A1* | 7/2018 | Chun | ................ | H04W 28/26 |
| 2018/0242115 A1* | 8/2018 | Kim | ................ | H04W 4/06 |
| 2018/0270722 A1* | 9/2018 | Kim | ................ | H04W 36/0072 |

FOREIGN PATENT DOCUMENTS

| | | |
|---|---|---|
| CN | 104410975 A | 3/2015 |
| CN | 104767798 A | 7/2015 |
| CN | 104869654 A | 8/2015 |
| EP | 2 793 520 A1 | 10/2014 |
| EP | 3 089 535 A1 | 11/2016 |
| WO | WO-2013/181515 A2 | 12/2013 |
| WO | WO-2014/012244 A1 | 1/2014 |
| WO | WO-2015/096719 A1 | 7/2015 |

OTHER PUBLICATIONS

Extended European Search Report for EP Appl. No. 16847858.4, dated Mar. 25, 2019.

* cited by examiner

METHOD AND APPARATUS FOR SENDING V2X SERVICE, AND METHOD AND APPARATUS FOR CONFIGURING RESOURCES

CROSS-REFERENCE TO RELATED APPLICATIONS

This application is a U.S. National Stage under 35 U.S.C. § 371 of International Patent Application No. PCT/CN2016/087245, filed on Jun. 27, 2016, which claims priority to Chinese Patent Application No. 201510618844.7, filed on Sep. 24, 2015, the contents of which are incorporated herein by reference in their entirety for all purposes.

TECHNICAL FIELD

The present disclosure relates to the field of communications and, in particular, to a method and apparatus for sending V2X service, and a method and apparatus for configuring resources.

BACKGROUND

The rapid development of social economy leads to the rapid growth of the quantity of autos in China and thus the frequent occurrence of road traffic accidents, which have become one of the important factors affecting the sense of public safety in China in recent years. The traffic safety has become one of the basic issues affecting social harmony and improvement of people's livelihood. China urgently needs to improve traffic safety in terms of technology, policy, education, etc. Among them, the improvement of vehicle safety design is an important part.

Technologies for improving vehicle safety are mainly divided into passive safety technologies and active safety technologies. Passive safety technologies are used to protect people and articles inside and outside a vehicle in an accident. Active safety technologies are used to prevent and reduce vehicle accidents and to prevent people from being harmed. Active safety technologies are the key and trend in the development of modern vehicle safety technologies.

It has become a new way for countries to try to solve road traffic safety problems by using advanced wireless communication technologies and a new generation of information processing technologies on the basis of a communication collision warning system to implement real-time information exchange between vehicles and between vehicles and roadside infrastructure, inform each other of the current status (including position, speed, acceleration and driving path of the vehicle) and the known road environment information, cooperatively acquire road hazard conditions, and provide collision warning information in time to prevent road traffic safety accidents.

Figure 1:
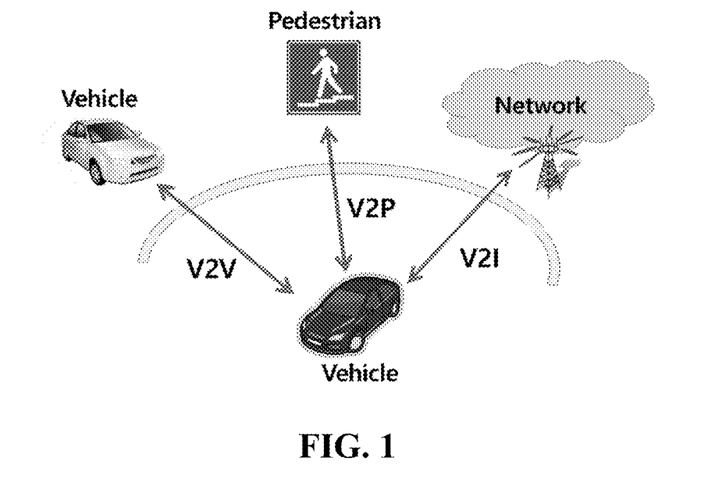
FIG. 1 is a schematic diagram of sending traffic and scheduling information to a vehicle through a network information platform in the related art.

Vehicle-to-Everything (V2X) refers to providing vehicle information through sensors, on-board terminals and electronic tags mounted on vehicles, implementing Vehicle-to-Vehicle (V2V), Vehicle-to-Pedestrian (V2P) and Vehicle-to-Infrastructure (V2I) intercommunications using various communication technologies, and effectively using information by way of extraction, sharing, etc. and effectively controlling and providing comprehensive services for vehicles by use of an information network platform. FIG. 1 is a schematic diagram of sending traffic and scheduling information to a vehicle through a network information platform in the related art.

In recent years, with the development of new mobile communication technologies, the Long Time Evolution (LTE) technology starts to be used in the world to solve problems in the research on application of V2X communication.

A Roadside Unit (RSU) has a function of gateway of receiving requests from a vehicle and ensuring the access of the vehicle to the Internet, as well as functions of data operation, storage and forwarding.

Vehicle-to-Roadside-Unit (V2R) is also referred to as V2I. The main features of V2R communication are described below.

(1) When an RSU broadcasts, broadcast messages are sent only to vehicles within the coverage area of the RSU.

(2) Single-hop transmission between an RSU and a vehicle prevents the adverse effects such as low packet transfer success rate and low network throughput caused by multi-hop.

(3) An RSU can quickly receive detected passing vehicles, traffic lights and some traffic information, and can process, reorder and select such information before sending the information to a vehicle.

The above three aspects ensure that a vehicle passing by an RSU is connected to the RSU so as to reliably accesses the Internet or download data stored in the RSU in real time.

Figure 2:
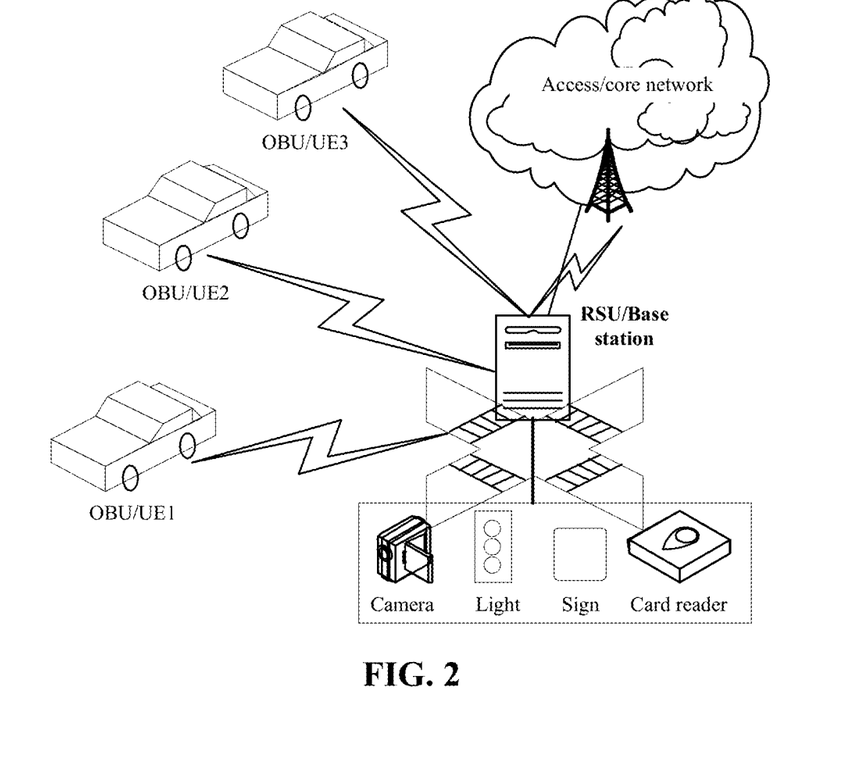
FIG. 2 is a schematic diagram of Device-to-Device (D2D) communication in 3GPP in the related art.

FIG. 2 is a schematic diagram of Device-to-Device (D2D) communication in 3GPP in the related art. As shown in FIG. 2, D2D user plane data is sent through an air interface PC5 between UEs and not through an Evolved Packet Core (EPC), while D2D control plane signaling passes through the EPC. D2D communication includes a scenario where a UE is within an LTE coverage area and a scenario where a UE is outside an LTE coverage area. D2D includes discovery and communication. A UE participating in D2D may schedule resources through an eNB or select resources from a resource pool to send data. D2D communication data is sent four times, i.e., the same data is sent four times. Incremental Redundancy (IR) provides reliability to a receiving UE merging data sent four times.

D2D communication includes resource scheduling SA and service data transmission. Resource scheduling specifies configuration of resources for of service data, and is sent twice. D2D discovery or communication uses LTE Physical Uplink Shared Channel (PUSCH) resources and a Single-carrier Frequency-Division Multiple Access approach.

In the process of researching and practicing the D2D technology in the related art, the following problems occur: the D2D technology is applicable to a low-speed scenario with a small number of UEs, so resource scheduling information and service data are sent separately, where scheduling information is sent twice and communication data is sent four times. However, in LTE V2X, the D2D technology in the related art cannot meet the requirements of a high-speed scenario with a large number of UEs.

SUMMARY

Embodiments of the present disclosure provide a method and apparatus for sending V2X service, and method and apparatus for configuring resources, so as to solve at least the problem in which resource scheduling information and service data can only be sent separately in the D2D technology in the related art.

According to one aspect of embodiments of the present disclosure, a method for sending V2X service is provided. The method includes that a first On-Board Unit (OBU) acquires sending resources for sending a V2X service, where the sending resources include resources required for sending V2X service data and scheduling information of the V2X service, and the scheduling information is used for specifying information required for resource scheduling for the V2X service data; and the first OBU sends, on the sending resources, the scheduling information and the V2X service data to a second OBU. A frequency-domain multiplexing is performed in a same subframe in the sending resources for scheduling information and the V2X service data, and the scheduling information specifies that resource configuration is performed, in same and/or different subframes, for the V2X service data.

In some embodiments, when the first OBU is within a coverage area of a Roadside Unit (RSU), the step in which the first OBU acquires the sending resources for sending the V2X service includes that the first OBU sends the RSU a request message for requesting the sending resources, and the first OBU receives resource configuration information of the sending resources that is sent by the RSU in response to the request message; or the first OBU acquires the sending resources from a first sending resource pool preconfigured by the RSU. The sending resources specify resources required by the scheduling information and the V2X service data, and a number of times the scheduling information and the V2X service data are sent in one resource cycle.

In some embodiments, when the first OBU is within the coverage area of the RSU, the scheduling information and V2X service data sent by the first OBU are detected by the second OBU according to a preconfigured receiving resource pool and received by the second OBU, where after receiving the scheduling information and V2X service data sent by the first OBU for multiple times, the second OBU merges, according to a predefined rule, the V2X service received for the multiple times.

In some embodiments, when the first OBU is outside a coverage area of an RSU, the step in which the first OBU acquires the sending resources for sending the V2X service includes that the first OBU selects the sending resources from a second sending resource pool preconfigured in the OBU and used for storing the sending resources, where the sending resources specify resources required for the scheduling information and the V2X service data, and a number of times the scheduling information and the V2X service data are sent in one resource period.

In some embodiments, when the first OBU is outside the coverage area of the RSU, the scheduling information and the V2X service data sent by the first OBU are detected by the second OBU according to a preconfigured receiving resource pool and received by the second OBU, where after receiving the scheduling information and the V2X service data sent by the first OBU for multiple times, the second OBU merges, according to a predefined rule, the V2X service received for the multiple times.

In some embodiments, the sending resources further include at least one of the following: a number of times the V2X service is sent, a resource period, and a scheduling period of Semi-Persistent Scheduling (SPS).

In some embodiments, resources for the scheduling information include time-frequency resources for the scheduling information; and resources for the V2X service data include time-frequency resources of the V2X service data and a Modulation and Coding Scheme (MCS) of the V2X service data.

In some embodiments, the scheduling information includes a time-frequency location of the V2X service, the MCS of the V2X service data, and an identifier of the second OBU; and the V2X service data includes at least one of the following: a Vehicle-to-Vehicle (V2V) service, a Vehicle-to-Infrastructure (V2I) service, a Vehicle-to-Pedestrian (V2P) service and a Vehicle-to-Network (V2N) service.

In some embodiments, when the scheduling information is dynamic scheduling information, before the first OBU sends, on the sending resources, the scheduling information and the V2X service data to the second OBU, the method further includes that when the V2X service occupies one subframe, the first OBU configures the scheduling information in each subframe where the V2X service data is located; or when the V2X service occupies multiple subframes, the first OBU configures the scheduling information in a first subframe or all of the subframes where the V2X service data is located.

In some embodiments, when the scheduling information is SPS information, the step in which the first OBU sends, on the sending resources, the scheduling information and the V2X service data to the second OBU includes that the first OBU specifies, in a first scheduling period of the SPS information, that the SPS information and the V2X service data are sent to the second OBU, and after the first scheduling period, the first OBU sends the V2X service data according to sending resources specified in the first scheduling period.

According to another aspect of embodiments of the present disclosure, a method for configuring V2X service resources is provided. The method includes that an RSU configures resource configuration information of a sending resource pool and a receiving resource pool of a V2X service; and the RSU configures the resource configuration information for an OBU.

In some embodiments, when the OBU is within a coverage area of the RSU, the step in which the RSU configures the resource configuration information for the OBU includes that the RSU receives a request message sent by the OBU and used for requesting sending resources; and the RSU sends the OBU the resource configuration information of the sending resources in response to the request message.

In some embodiments, the sending resources include resources required for sending V2X service data and scheduling information of the V2X service, and the scheduling information is used for specifying information required for resource scheduling for the V2X service data.

In some embodiments, the sending resources specify resources required for the scheduling information and the V2X service data, and a number of times the scheduling information and the V2X service data are sent in one resource period.

According to yet another aspect of embodiments of the present disclosure, an apparatus for sending V2X service, which is applied to a first OBU, is provided. The apparatus includes an acquisition module, which is configured to acquire sending resources for sending a V2X service, where the sending resources include resources required for sending V2X service data and scheduling information of the V2X service, the scheduling information is used for specifying information required for resource scheduling for the V2X service data; and a first sending module, which is configured to send, on the sending resources, the scheduling information and the V2X service data to a second OBU. A frequency-domain multiplexing is performed in a same subframe in the sending resources for the scheduling information and the V2X service data, and the scheduling information specifies that resource configuration is performed, in same and/or different subframes, for the V2X service data.

In some embodiments, when the first OBU is within a coverage area of a first Roadside Unit (RSU), the acquisition module includes a first sending unit, which is configured to send the RSU a request message for requesting the sending resources, and a first receiving unit, which is configured to receive resource configuration information of the sending resources that is sent by the RSU in response to the request message; or an acquisition unit, which is configured to acquire the sending resources from a first sending resource pool preconfigured by the RSU. The sending resources specify resources required for the scheduling information and the V2X service data, and a number of times the scheduling information and the V2X service data are sent in one resource period.

In some embodiments, when the first OBU is within the coverage area of the RSU, the scheduling information and the V2X service data sent by the first OBU are detected by the second OBU according to a receiving resource pool configured by the RSU and received by the second OBU, where after receiving the scheduling information and the V2X service data sent by the first OBU for multiple times, the second OBU merges, according to a predefined rule, the V2X service received for the multiple times.

In some embodiments, when the first OBU is outside a coverage area of an RSU, the acquisition module includes a selection unit, which is configured to select the sending resources from a second sending resource pool preconfigured in the OBU and used for storing the sending resources, where the sending resources specify resources required for the scheduling information and the V2X service data, and a number of times the scheduling information and the V2X service data are sent in one resource period.

In some embodiments, when the first OBU is outside the coverage area of the RSU, the scheduling information and the V2X service data sent by the first OBU are detected by the second OBU according to a preconfigured receiving resource pool and received by the second OBU, where after receiving the scheduling information and the V2X service data sent by the first OBU for multiple times, the second OBU merges, according to a predefined rule, the V2X service received for the multiple times.

In some embodiments, the sending resources further include at least one of the following: a number of times the V2X service is sent, a resource period, and a scheduling period of SPS.

In some embodiments, resources for the scheduling information include time-frequency resources for the scheduling information; and resources for the V2X service data include time-frequency resources of the V2X service data and a MCS of the V2X service data.

In some embodiments, the scheduling information includes a time-frequency location of the V2X service, the MCS of the V2X service data, and an identifier of the second OBU; and the V2X service data includes at least one of the following: a V2V service, a V2I service, a V2P service and a V2N service.

In some embodiments, wherein when the scheduling information is dynamic scheduling information, before the first OBU sends, on the sending resources, the scheduling information and the V2X service data to the second OBU, the apparatus further includes a first configuration module, which is configured to, when the V2X service occupies only one subframe, configure the scheduling information in each subframe where the V2X service data is located; or a second configuration module, which is configured to, when the V2X service occupies multiple subframes, configure the scheduling information in a first subframe or all of the subframes where the V2X service data is located.

In some embodiments, when the scheduling information is SPS information, the first sending module includes a specifying unit, which is configured to specify, in a first scheduling period of the SPS information, that the SPS information and the V2X service data are sent to the second OBU; and a second sending unit, which is configured to, after the first scheduling period, send the V2X service data according to sending resources specified in the first scheduling period.

According to yet another aspect of embodiments of the present disclosure, an apparatus for configuring V2X service resources, which is applied to an RSU, is provided. The apparatus includes a third configuration module, which is configured to configure resource configuration information of a sending resource pool and a receiving resource pool of a V2X service; and a fourth configuration module, which is configured to configure the resource configuration information for an OBU.

In some embodiments, the fourth configuration module includes a second receiving unit, which is configured to receive a request message sent by the OBU and used for requesting sending resources; and a third sending unit, which is configured to send the OBU the resource configuration information of the sending resources in response to the request message.

In some embodiments, the sending resources include resources required for sending V2X service data and scheduling information of the V2X service, and the scheduling information is used for specifying information required for resource scheduling for the V2X service data.

In some embodiments, the sending resources specify resources required for the scheduling information and the V2X service data, and a number of times the scheduling information and the V2X service data are sent in one resource period.

Through embodiments of the present disclosure, a first OBU acquires sending resources for sending a V2X service, where the sending resources include resources required for sending V2X service data and scheduling information of the V2X service, and the scheduling information is used for specifying information required for resource scheduling for the V2X service data; and the first OBU sends, on the sending resources, the scheduling information and the V2X service data to a second OBU, i.e., sends the scheduling information and the V2X service data simultaneously through the acquired sending resources. The present disclosure enables that resource scheduling information and V2X service data can not only be sent separately in the D2D technology in the related art.

BRIEF DESCRIPTION OF DRAWINGS

The accompanying drawings described herein are used to provide a further understanding of the present disclosure, and form a part of the present application. The exemplary embodiments and descriptions thereof in the present disclosure are used to explain the present disclosure and do not limit the present disclosure in an improper way. In the accompanying drawings.

DETAILED DESCRIPTION

The present disclosure will be described hereinafter in detail with reference to the accompanying drawings in connection with the embodiments. It is to be noted that if not in collision, the embodiments and features therein in the present application can be combined with each other.

It is to be noted that the terms "first", "second" and the like in the description, claims and drawings of the present disclosure are used to distinguish between similar objects and are not necessarily used to describe a particular order or sequence.

Figure 3:
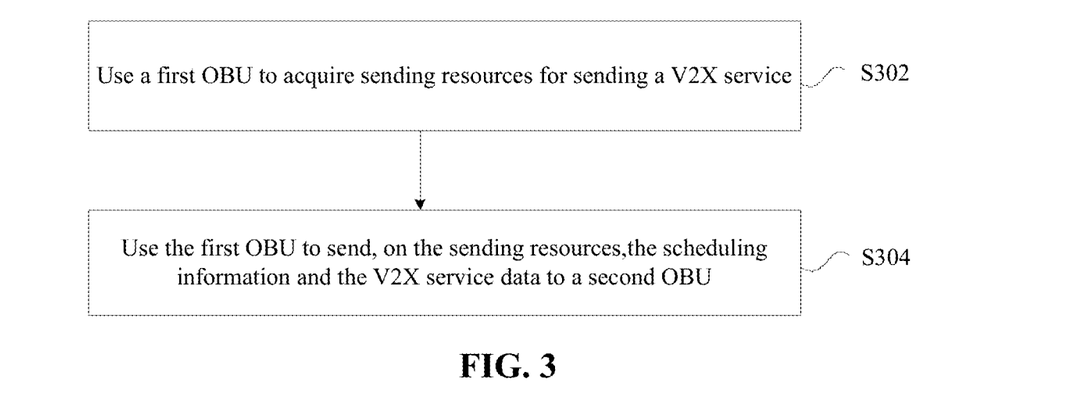
FIG. 3 is a flowchart of a method for sending V2X service according to an embodiment of the present disclosure.

This embodiment provides a method for sending V2X service. FIG. 3 is a flowchart of a method for sending V2X service according to an embodiment of the present disclosure. As shown in FIG. 3, the method includes the steps described below.

In step S302, a first OBU acquires sending resources for sending a V2X service, where the sending resources include resources required for sending V2X service data and scheduling information of the V2X service, and the scheduling information is used for specifying information required for resource scheduling for the V2X service data.

In step S304, the first OBU sends, on the sending resources, the scheduling information and the V2X service data to a second OBU.

Frequency-domain multiplexing is performed in a same subframe in the sending resources for the scheduling information and the V2X service data, and the scheduling information specifies that resource configuration is performed, in same and/or different subframes, for the V2X service data.

Through steps S302 and S304 in this embodiment of the present disclosure, a first OBU acquires sending resources for sending a V2X service, where the sending resources include resources required for sending V2X service data and scheduling information of the V2X service, and the scheduling information is used for specifying information required for resource scheduling for the V2X service data; and the first OBU sends, on the sending resources, the scheduling information and the V2X service data to a second OBU. It can be seen that, according to this embodiment, the first OBU sends the scheduling information and the V2X service data simultaneously through the acquired sending resources.

In an optional implementation mode of this embodiment, when the first OBU is within a coverage area of an RSU, step S302 in which the first OBU acquires the sending resources for sending the V2X service in this embodiment is implemented using the methods described below.

Method 1:

In step S11, the first OBU sends the RSU a request message for requesting the sending resources.

In step S12, the first OBU receives resource configuration information of the sending resources that is sent by the RSU in response to the request message.

Method 2:

The first OBU acquires the sending resources from a first sending resource pool preconfigured by the RSU, where the sending resources specify resources required for the scheduling information and the V2X service data, and a number of times the scheduling information and the V2X service data are sent in one resource period.

It is to be noted that the number of times may be determined according to vehicle density, channel quality of PC5 interface, operator strategy, etc. Usually this number of times is 1 to 4, i.e., 0 to 3 retransmissions. Incremental Redundancy is used in retransmissions, which means that each retransmission is different from the first transmission. If the vehicle density is low and the channel quality of PC5 interface is poor, the number of times is determined to be great.

On the basis of the above optional implementation mode, when the first OBU is within the coverage area of the RSU, the scheduling information and V2X service data sent by the first OBU are detected by the second OBU according to a preconfigured receiving resource pool and then received by the second OBU, where after receiving the scheduling information and the V2X service data sent by the first OBU for multiple times, the second OBU merges, according to a predefined rule, the V2X service received for the multiple times.

The predefined rule is that the first OBU sends V2X scheduling information and service data by way of Incremental Redundancy. Versions sent by way of Incremental Redundancy are sent in the order of 0, 2, 3 and 1. If the second OBU successfully decodes received V2X scheduling information and service data sent for the first time, the second OBU does not receive subsequent resent versions. If the second OBU fails to decode the received V2X scheduling information and service data sent for the first time, the second OBU merges a later version with the first version until the decoding succeeds.

In another optional implementation mode of this embodiment, when the first OBU is outside a coverage area of an RSU, step S302 in which the first OBU acquires the sending resources for sending the V2X service in this embodiment is implemented using the following method: the first OBU selects the sending resources from a second sending resource pool preconfigured in the OBU and used for storing the sending resources, where the sending resources specify resources required for the scheduling information and the V2X service data, and a number of times the scheduling information and the V2X service data are sent in one resource period.

On the basis of the above optional implementation mode, when the first OBU is outside the coverage area of the RSU, the scheduling information and V2X service data sent by the first OBU are detected by the second OBU according to a receiving resource pool configured by the RSU and received by the second OBU, where after receiving the scheduling information and V2X service data sent by the first OBU for multiple times, the second OBU merges, according to a predefined rule, the V2X service received for the multiple times.

The sending resources involved in this embodiment further include at least one of the following: a number of times the V2X service is sent, a resource period, and a scheduling period of SPS. Resources for the scheduling information include time-frequency resources for the scheduling information; and resources for the V2X service data include time-frequency resources of the V2X service data and a MCS of the V2X service data.

The resource period has different values depending on different V2X service requirements.

Additionally, the scheduling information includes a time-frequency location of the V2X service, the MCS of the V2X service data, and an identifier of the second OBU; and the V2X service data includes at least one of the following: a V2V service, a V2I service, a V2P service and a V2N service.

In another optional implementation mode of this embodiment, when the scheduling information is dynamic scheduling information, before the first OBU sends, on the sending resources, the scheduling information and the V2X service data to the second OBU, the method of this embodiment further includes the steps described below.

In step S21, when the V2X service occupies one subframe, the first OBU configures the scheduling information in each subframe where the V2X service data is located; or In step S22, when the V2X service occupies multiple subframes, the first OBU configures the scheduling information in a first subframe or all of the subframes where the V2X service data is located.

When the scheduling information is SPS information, step S304 in which the first OBU sends, on the sending resources, the scheduling information and the V2X service data to the second OBU is implemented using the following method: the first OBU specifies, in a first scheduling period of the SPS information, that the SPS information and the V2X service data are sent to the second OBU, and after the first scheduling period, the first OBU sends the V2X service data according to sending resources specified in the first scheduling period.

Figure 4:
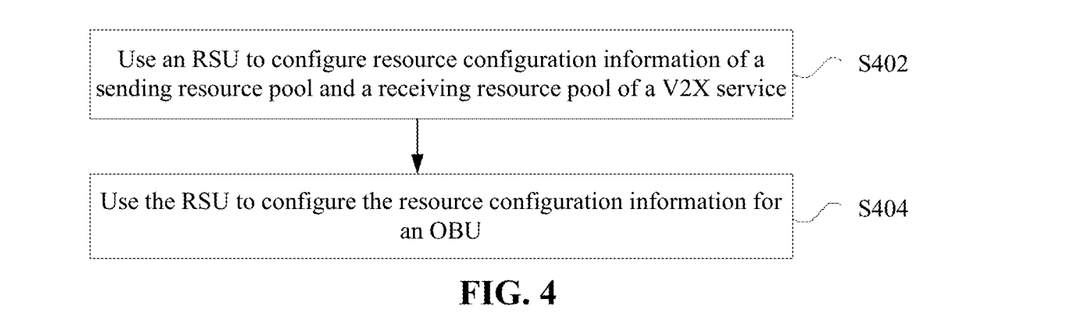
FIG. 4 is a flowchart of a method for configuring V2X service resources according to an embodiment of the present disclosure.

FIG. 4 is a flowchart of a method for configuring V2X service resources according to an embodiment of the present disclosure. As shown in FIG. 4, the method includes the steps described below.

In step S402, an RSU configures resource configuration information of a sending resource pool and a receiving resource pool of a V2X service.

In step S404, the RSU configures the resource configuration information for an OBU.

When the OBU involved in the step S404 of this embodiment is within a coverage area of the RSU, the RSU configures the resource configuration information for the OBU is implemented using the methods described below.

Method 1: when the OBU is within the coverage area of the RSU, the method includes the steps described below.

In step S31, the RSU receives a request message sent by the first OBU and used for requesting sending resources.

In step S32, the RSU sends the first OBU the resource configuration information of the sending resources in response to the request message.

The sending resources involved in this embodiment include resources required for sending V2X service data and scheduling information of the V2X service, and the scheduling information is used for specifying information required for resource scheduling for the V2X service data. The sending resources specify resources required for the scheduling information and the V2X service data, and a number of times the scheduling information and the V2X service data are sent in one resource period.

From the description of the embodiments described above, it will be apparent to those skilled in the art that the method of any embodiment described above may be implemented by means of software plus a necessary general-purpose hardware platform, or may of course be implemented by hardware. However, in most cases, the former is a preferred embodiment. Based on this understanding, the embodiments of the present disclosure may be embodied in the form of a software product. The software product is stored in a storage medium (such as a ROM/RAM, a magnetic disk or an optical disk) and includes several instructions for enabling a terminal device (which may be a mobile phone, a computer, a server or network equipment) to execute the method according to each embodiment of the present disclosure.

Embodiments of the present disclosure further provide an apparatus for sending V2X service, which is used for implementing the above-mentioned embodiments and preferred embodiments. What has been described will not be repeated. As used below, the term "module" may be software, hardware or a combination thereof capable of implementing preset functions. The apparatus in the embodiment described below is preferably implemented by software, but implementation by hardware or by a combination of software and hardware is also possible and conceived.

Figure 5:
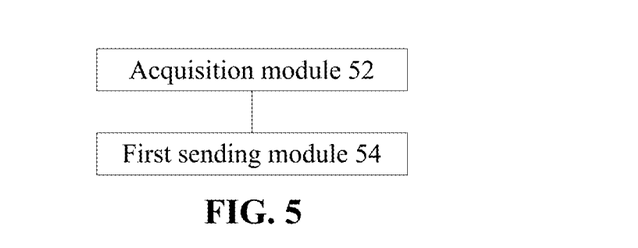
FIG. 5 is a block diagram of an apparatus for sending V2X service according to an embodiment of the present disclosure.

FIG. 5 is a block diagram of an apparatus for sending V2X service according to an embodiment of the present disclosure. The apparatus is applied to a first OBU. As shown in FIG. 5, the apparatus includes an acquisition module 52, which is configured to acquire sending resources for sending a V2X service, where the sending resources include resources required for sending V2X service data and scheduling information of the V2X service, and the scheduling information is used for specifying information required for resource scheduling for the V2X service data; and a first sending module 54, which is coupled to the acquisition module 52 and configured to send, on the sending resources, the scheduling information and the V2X service data to a second OBU. Frequency-domain multiplexing is performed in a same subframe in the sending resources for scheduling information and the V2X service data, and the scheduling information specifies that resource configuration is performed, in same and/or different subframes, for the V2X service data.

Optionally, when the first OBU is within a coverage area of a first RSU, the acquisition module 42 includes a first sending unit, which is configured to send the RSU a request message for requesting the sending resources, and a first receiving unit, which is configured to receive resource configuration information of the sending resources that is sent by the RSU in response to the request message; or an acquisition unit, which is configured to acquire the sending resources from a first sending resource pool preconfigured by the RSU. The sending resources specify resources required for the scheduling information and the V2X service data, and a number of times the scheduling information and the V2X service data are sent in one resource period.

On the basis of the above, when the first OBU is within the coverage area of the RSU, the scheduling information and the V2X service data sent by the first OBU are detected by the second OBU according to a receiving resource pool configured by the RSU and received by the second OBU, where after receiving the scheduling information and the V2X service data sent by the first OBU for multiple times, the second OBU merges, according to a predefined rule, the V2X service received for the multiple times.

Optionally, when the first OBU is outside a coverage area of an RSU, the acquisition module 42 includes a selection unit, which is configured to select the sending resources from a second sending resource pool preconfigured in the OBU and used for storing the sending resources, where the sending resources specify resources required for the scheduling information and the V2X service data, and a number of times the scheduling information and the V2X service data are sent in one resource period.

On the basis of the above, when the first OBU is outside the coverage area of the RSU, the scheduling information and the V2X service data sent by the first OBU are detected by the second OBU according to a preconfigured receiving resource pool and received by the second OBU, where after receiving the scheduling information and the V2X service data sent by the first OBU for multiple times, the second OBU merges, according to a predefined rule, the V2X service received for the multiple times.

It is to be noted that the sending resources involved in this embodiment further include at least one of the following: a number of times the V2X service is sent, a resource period, and a scheduling period of SPS.

Resources for the scheduling information may include time-frequency resources for the scheduling information; and resources for the V2X service data include time-frequency resources of the V2X service data and a MCS of the V2X service data. The scheduling information may includes a time-frequency location of the V2X service, the MCS of the V2X service data, and an identifier of the second OBU; and the V2X service data includes at least one of the following: a V2V service, a V2I service, a V2P service and a V2N service.

Optionally, when the scheduling information is dynamic scheduling information, before the first OBU sends, on the sending resources, the scheduling information and the V2X service data to the second OBU, the apparatus further includes a first configuration module, which is configured to, when the V2X service occupies one subframe, configure the scheduling information in each subframe where the V2X service data is located; or a second configuration module, which is configured to, when the V2X service occupies multiple subframes, configure the scheduling information in a first subframe or all of the multiple subframes where the V2X service data is located.

Optionally, when the scheduling information is SPS information, the first sending module includes a specifying unit, which is configured to specify, in a first scheduling period of the SPS information, that the SPS information and the V2X service data are sent to the second OBU; and a second sending unit, which is configured to, after the first scheduling period, send the V2X service data according to sending resources specified in the first scheduling period.

Figure 6:
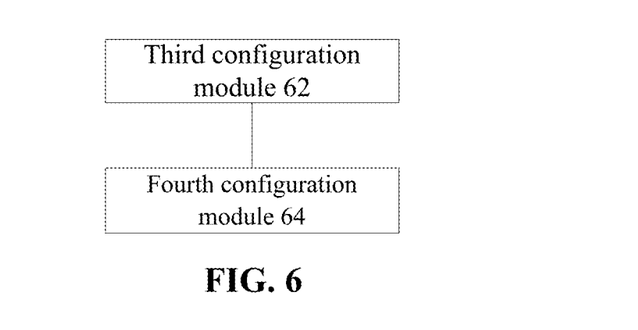
FIG. 6 is a block diagram of an apparatus for configuring V2X service resources according to an embodiment of the present disclosure.

FIG. 6 is a block diagram of an apparatus for configuring V2X service resources according to an embodiment of the present disclosure. The apparatus is applied to an RSU. As shown in FIG. 6, the apparatus includes a third configuration module 62, which is configured to configure resource configuration information of a sending resource pool and a receiving resource pool of a V2X service; and a fourth configuration module 64, which is coupled to the third configuration module 62 and configured to configure the resource configuration information for an OBU.

Optionally, the fourth configuration module 62 includes a second receiving unit, which is configured to receive a request message sent by the OBU and used for requesting sending resources; and a third sending unit, which is coupled to the second receiving unit and configured to send the OBU the resource configuration information of the sending resources in response to the request message.

The sending resources involved in this embodiment include resources required for sending V2X service data and scheduling information of the V2X service, and the scheduling information is used for specifying information required for resource scheduling for the V2X service data. The sending resources specify resources required for the scheduling information and the V2X service data, and a number of times the scheduling information and the V2X service data are sent in one resource period.

The various modules described above may be implemented by software or hardware. Implementation by hardware may, but may not necessarily, be performed by the following method: The various modules described above are located in a same processor or their respective processors.

The present disclosure will be illustrated below in conjunction with an optional embodiment of the present disclosure.

This optional embodiment provides a method for sending V2X service. The method includes that an OBU requests a base station to allocate sending resources of a V2X service or selects the sending resources of the V2X service from a resource pool, and the base station that receives the request sends V2X scheduling information to the OBU; and the OBU sends, on specific subframe locations of the sending resources, resource scheduling information of the V2X service. The resource scheduling information specifies resources occupied by V2X service data in same and/or different subframes, and the base station specifies a number of times the V2X scheduling information and/or the V2X service data are sent.

To achieve the above purpose, the method of this optional embodiment includes the steps described below.

In step S301, the OBU prepares to send the V2X service, and the OBU obtains the sending resources of the V2X service.

The V2X service to be sent by the OBU includes a Cooperative Awareness Message (CAM) service or a Decentralized Environmental Notification Message (DENM) service. The OBU has two ways to obtain the sending resources of the V2X service: scheduling or autonomous selection. Scheduling means that the OBU sends a request to the eNB and the base station allocates resources to the OBU. Autonomous selection means that the OBU randomly selects the required resources from resources allocated by the base station and resources in the preconfigured resource pool.

Figure 7:
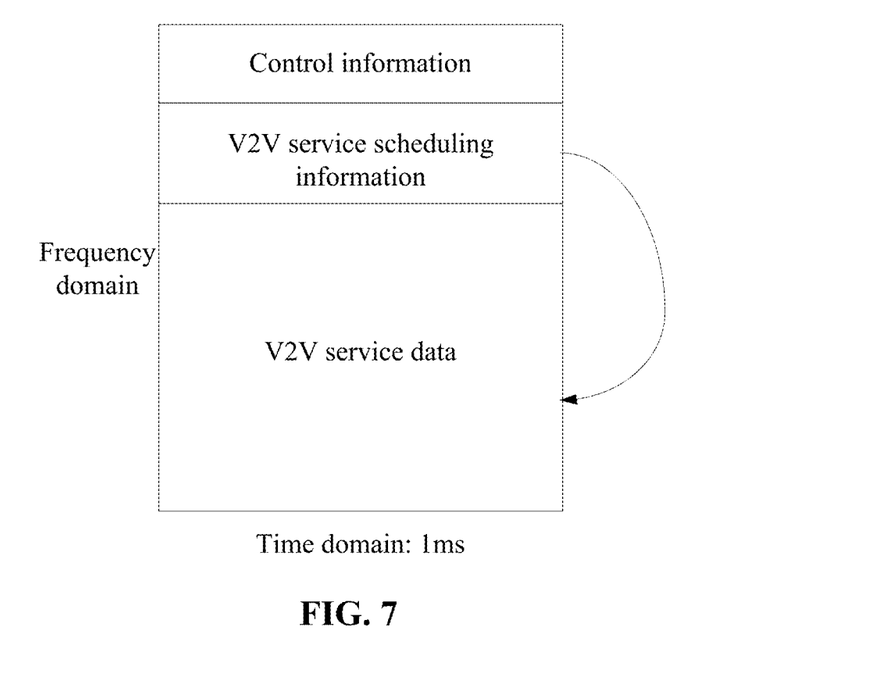
FIG. 7 is a schematic diagram of V2X scheduling information according to an optional embodiment of the present disclosure.

The sending resources include resources for scheduling information and resources for V2X service. The resources for scheduling information are allocated in a fixed way, and the specific resource allocation process is that the eNB sends the resource configuration of the V2X service through the DCI format 5 in the Physical Downlink Control Channel (PDCCH)/Enhanced Physical Downlink Control Channel (ePDCCH), including, but not limited to, time-frequency location and Modulation and Coding Scheme (MCS). The scheduling information resources may also adopt a static allocation manner in a subframe. That is, the V2X scheduling information is sent in a fixed frequency-domain location of the first subframe bearing the V2X service; or the eNB specifies, in the DCI-5, a subframe where the V2X scheduling information is located, and the V2X scheduling information is sent in a fixed frequency-domain location of this subframe. Fixed allocation means that the V2X scheduling information is located in a fixed position: one entire TTI is occupied in time domain and the frequency-domain location is fixed, the size is fixed (initial location and length of RB are fixed) excluding frequency-domain locations of CQI/DMRS/ACK/NACK, and where the content is insufficient is filled with 0. FIG. 7 is a schematic diagram of V2X scheduling information according to an optional embodiment of the present disclosure.

To eliminate the influence of a Doppler shift in a V2X high-speed driving environment, Demodulation Reference Signal (DMRS) is improved in the following manners: (1) The existing LTE PUSCH uses time domain multiplexing to send the DMRS twice in one subframe. In this optional embodiment, the number of transmissions may be increased to 3 to 4; (2) The frequency domain is multiplexed (the frequency domain occupies one subcarrier), the DMRS occupies one subframe in time domain, and the number of transmissions is one or two in one subframe.

Figure 8:
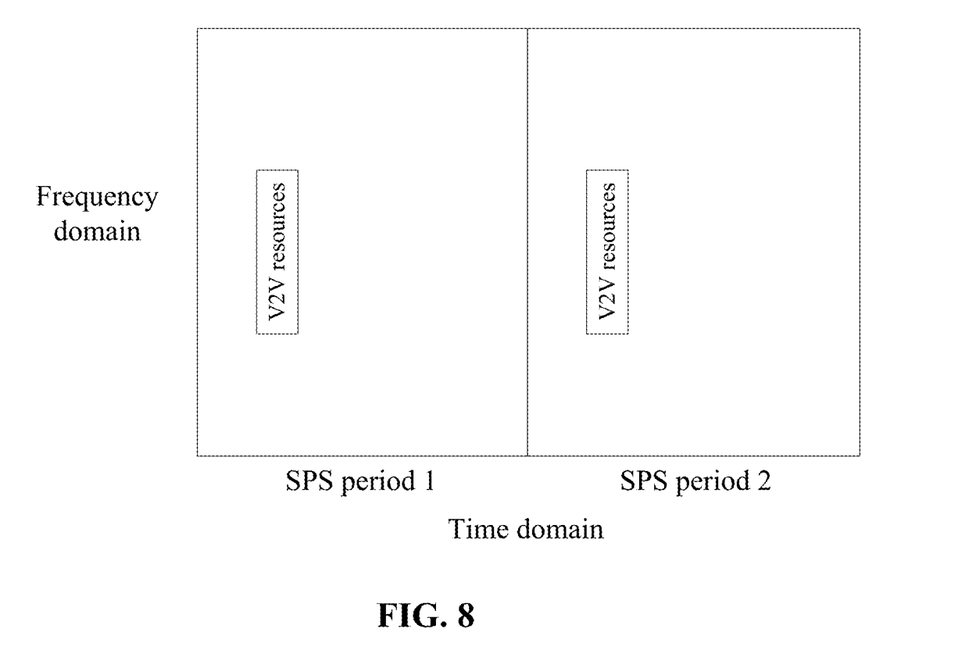
FIG. 8 is a schematic diagram of SPS according to an optional embodiment of the present disclosure.

OBU detection (using specific RNTI detection) reads the content of the DCI-5 and sets the content of the V2X scheduling information according to the content of the DCI-5. FIG. 8 is a schematic diagram of SPS according to an optional embodiment of the present disclosure. As shown in FIG. 8. one subframe is multiplexed for the V2X scheduling information and the V2X service sent by the OBU or the V2X scheduling information specifies scheduling of other V2X service subframes at the same time. The V2X service scheduling information includes at least: a time-frequency location, a MCS, and a target OBU identifier.

The eNB may select dynamic scheduling or Semi-Persistent Scheduling (SPS). For example, according to service requirements, SPS may be adopted for CAM data and dynamic scheduling may be adopted for a DEMN service; if SPS is adopted, the eNB needs to specify an SPS period through a Radio Resource Control (RRC) signaling message and specifies SPS activation/release in the DCI-5. After the OBU reads the DCI-5, the OBU sets an SPS activation/release flag in the V2X scheduling information. When the SPS is activated, the V2X service is scheduled on the same resources in the SPS period and the V2X scheduling information is sent in the first SPS period and not sent in subsequent SPS periods. When the SPS is released/deactivated, V2X uses dynamic scheduling. For dynamic scheduling, each V2X subframe can adopt different resource configurations and a fixed position in each V2X service subframe has corresponding V2X scheduling information.

If a sending OBU autonomously selects sending resources from a preset resource pool or a resource pool configured by the eNB, the sending OBU sets the contents of the V2X scheduling information according to the selected resources. For autonomous selection by the OBU: (1) The resource pool does not allocate scheduling information resources, and the resources are fixed. (2) The OBU selects service resources from the resource pool, including (1) selection from resource pools with different priorities and (2) probabilistic selection from identical resource pools. During this process, probabilistic selection is performed. Probabilistic selection means that the eNB sends a probability parameter Pt through an RRC signaling message and the OBU selects a random number Pc (0-1). If Pc<Pt, the OBU randomly selects resources for the V2X service from the resource pool; otherwise, the OBU continues selecting the random number Pc and repeats the preceding process until resources can be selected.

If one piece of V2X information occupies multiple subframes, the scheduling information is sent in only the first subframe, and this scheduling information specifies resource configuration in the current subframe and the remaining subframes, or the eNB specifies the time-frequency location of the V2X scheduling information and, in the scheduling information, specifies multiple subframes allocated to V2X and resource configuration for the V2X service in the subframes.

The scheduling information and the V2X service sent by the OBU are sent at a PC5 air interface or a Uu air interface.

OBU service scheduling is performed when the OBU is within an eNB coverage area. The OBU autonomously selects resources when the OBU is within or outside the eNB coverage area. When the OBU is within the eNB coverage area, the resource pool is configured by the eNB. When the OBU is outside the eNB coverage area, the resource pool is locally preconfigured in the OBU.

The V2X service in this optional embodiment includes at least one of the following: V2V, V2I, V2P and V2N.

In step S302, the base station specifies the number of transmissions of the V2X service.

The base station specifies, through an RRC signaling message, the number of repeated transmissions of the V2X service, e.g., through a system broadcast message or an RRC connection reconfiguration message. The number of retransmissions is 0 to 3 times, i.e., 1 to 4 sending times. Note that retransmission here refers to Incremental Redundancy (IR) retransmission. That is, for the same original information, the data sent each time is not exactly the same and is sent according to a fixed IR version, i.e., according to the order of versions 0, 2, 3 and 1. The receiver merges different IR versions according to the IR sequence to improve the reliability of the V2X service. For V2X scheduling information, the eNB may also specify the number of retransmissions, such as 0 to 1 time. In general, for CAM or periodic V2X information, the number of reselections in one period may be 0 to 1 time. For DENM or event-triggered V2X information, the number of reselections is generally 0 to 3 times. The eNB specifies the reselection mode, i.e., the resource configuration of the resent data. If retransmission is performed, the sending OBU may specify information of retransmission mode in the V2X scheduling information, or the eNB specifies the information of retransmission mode via the system broadcast message.

If the sending OBU autonomously selects the sending resources from a preset resource pool or a resource pool configured by the eNB, the number of transmissions of the V2X service is specified in the resource pool.

V2X transmission is performed on an uplink channel PUSCH. HARQ of the PUSCH adopts the synchronous non-adaptive mode. That is, the retransmission occurs at a fixed interval relative to the initial transmission time. The receiver has known the location of the retransmission. To reduce the uplink signaling load, the non-adaptive mode is adopted. That is, retransmission and initial transmission use the same parameters such as RB, MSC and power.

In step S303, a receiving OBU detects a subframe where the V2X scheduling information and/or the V2X service may exist.

According to the receiving resource pool specified by the eNB, a subframe is detected in the receiving resource pool or specified in the V2X scheduling information. The V2X scheduling information includes a target identifier, e.g., a target group identifier. The receiving OBU determines whether it belongs to the target identifier. If the receiving OBU belongs to the target identifier, the receiving OBU receives the required V2X service; otherwise, the detection continues.

The OBU is in an RRC_Connected mode or RRC_Idle mode. It is to be noted that the resource pool includes a sending resource pool and a receiving resource pool.

In addition, the OBU involved in this optional embodiment is equivalent to a user equipment UE and the eNB may be used as the RSU. When a static UE serves as the RSU, this optional embodiment is applicable to a V2I service.

A detailed description is given below in conjunction with specific examples of this embodiment and accompanying drawings.

Embodiment 1

Figure 9:
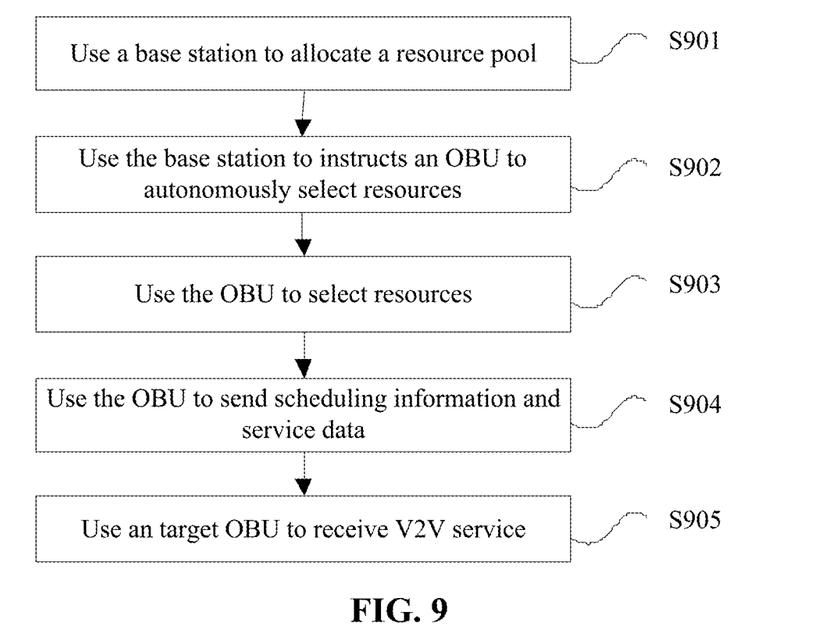
FIG. 9 is a flowchart of a method according to optional embodiment 1 of the present disclosure.

This embodiment is directed to a scenario in which an OBU within a coverage area of a base station sends a V2X service through autonomously selected resources. FIG. 9 is a flowchart of a method according to optional embodiment 1 of the present disclosure. As shown in FIG. 9, the method of this embodiment includes the steps described below.

In step S901, the base station allocates a resource pool.

The base station notifies the allocated resource pool through a system broadcast message or a dedicated RRC message. The resource pool includes at least one of the following resources: time-frequency resources for scheduling information, time-frequency resources for service data, a number of times V2X scheduling information and/or service is resent, a sending probability, a scheduling information MCS, a service MCS, and a scheduling period of SPS.

In view that the scheduling information is generally sent in a fixed frequency-domain location in a subframe, a time-domain location of the scheduling information may be specified in the resource pool.

In addition, the resource pool may include one or more resource pools. In the case of multiple resource pools, each of the multiple resource pools corresponds to a respective one of V2X services with different priorities, i.e., different resource pools do not overlap with each other. The resource pool includes two types: a sending resource pool and a receiving resource pool. The sending resource pool may be a subset of the receiving resource pool, i.e., the receiving resource pool includes the sending resource pool.

In step S902, the base station instructs the OBU to autonomously select resources.

The base station instructs, through a system broadcast message or a dedicated RRC message, the OBU to autonomously select resources.

In step S903, the OBU selects resources.

The OBU selects resources from a corresponding sending resource pool according to service attributes.

In step S904, the OBU sends V2X scheduling information and the V2X service.

The OBU sets the content of the V2X scheduling information. The scheduling information includes at least one of the following: a time-frequency location of the V2X service, a MCS of the V2X service and a target OBU identifier. Additionally, if SPS is used, the scheduling information may further include an SPS activation/deactivation identifier.

The scheduling information and the service are sent in the same subframe or in different subframes. If the scheduling information and the service are sent in in different subframes, the scheduling information further includes subframe configuration of the V2X service.

The OBU sends the V2X scheduling information and service one or more times according to the instruction of the base station. If the OBU sends the V2X scheduling information and service multiple times, a resending mode includes parameters such as resent IR versions and resent resources. The parameters of this mode are all specified by the eNB. Initially sent scheduling information further includes a resending mode parameter.

In step S905, a target OBU receives the V2X service.

The target OBU detects the receiving resource pool; or after receiving the scheduling information, the target OBU detects a corresponding subframe as specified through the scheduling information; or the target OBU detects the corresponding subframe as specified through the system broadcast message of the base station.

If the target OBU detects the required scheduling information, the target OBU continues receiving a corresponding V2X service. The scheduling information is the required scheduling information if the target OBU determines that the identifier of the target OBU belongs to the OBU identifier in the scheduling information. The target OBU identifier may be an identifier of a target OBU group or a target OBU ID.

Embodiment 2

Figure 10:
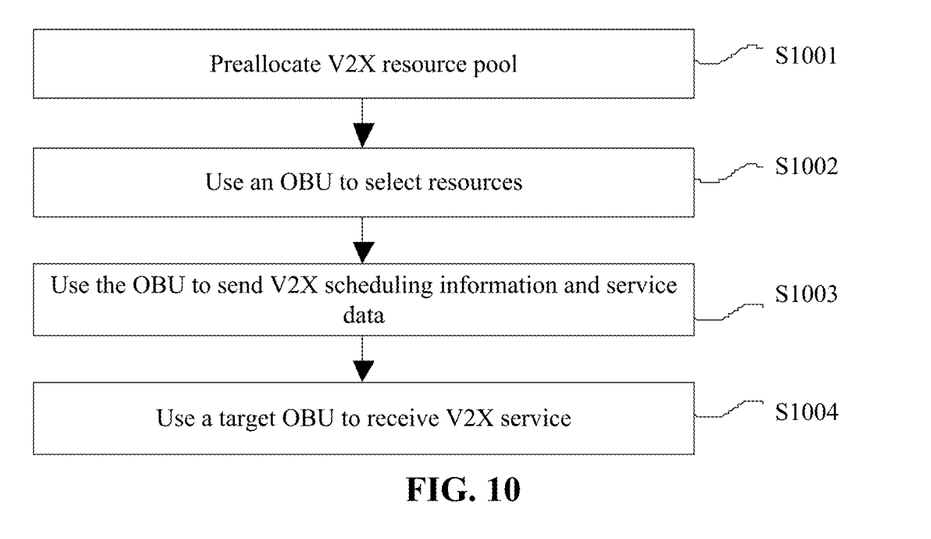
FIG. 10 is a flowchart of a method according to optional embodiment 2 of the present disclosure.

This embodiment is directed to a scenario in which an OBU sends a V2X service outside an coverage area of an RSU. FIG. 10 is a flowchart of a method according to optional embodiment 2 of the present disclosure. As shown in FIG. 10, the method of this embodiment includes the steps described below.

In step S1001, V2X resource pools are preallocated.

The preallocation is locally stored in the OBU (e.g., in an OBU memory card) when the OBU is within a coverage area of a base station or before the OBU is delivered from a factory. The preallocation is generally performed by the base station or a network manager. The resource pools include a sending resource pool and a receiving resource pool. The sending resource pool is used for sending the V2X service outside the coverage area of the base station. The receiving resource pool is used by the OBU to monitor the V2X service outside the coverage area of the base station.

The specific content of the resource pools is similar to that involved in step S801 in embodiment 1.

In step S1002, the OBU selects resources.

In step S1003, the OBU sends V2X scheduling information and service data.

This step S1003 is the same as step S904 and will not be repeated here.

In step S1004, a target OBU receives the V2X service.

This step S1004 is the same as step S905 and will not be repeated here.

Embodiment 3

Figure 11:
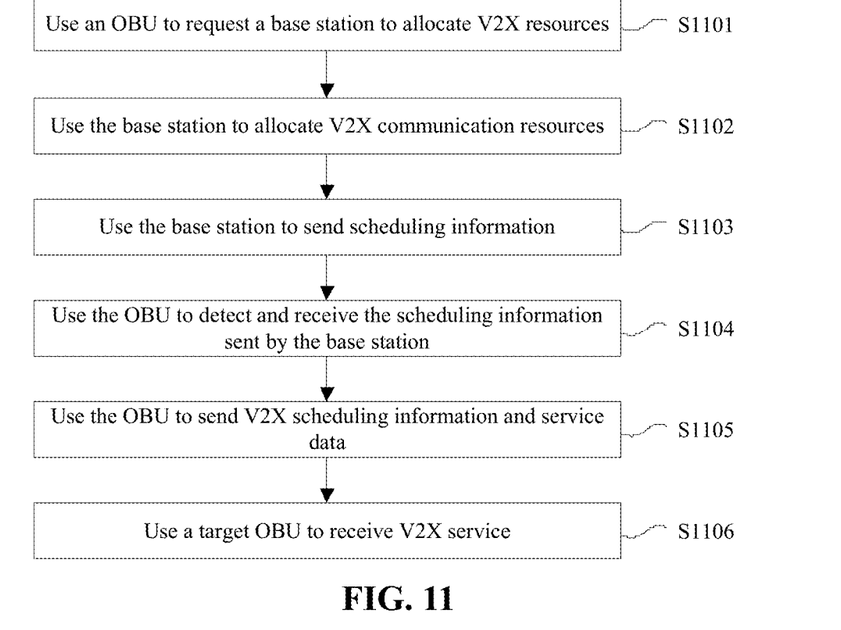
FIG. 11 is a flowchart of a method according to optional embodiment 3 of the present disclosure.

This embodiment is directed to a scenario in which an OBU sends a V2X service using dynamic scheduling within a coverage area of an RSU. FIG. 11 is a flowchart of a method according to optional embodiment 3 of the present disclosure. As shown in FIG. 11, the method of this embodiment includes the steps described below.

In step S1101, the OBU requests a base station to allocate V2X resources.

The OBU has V2X information to be sent. The OBU sends instruction information to a base station through RRC signaling. The instruction information is used to request the base station to allocate resources.

In step S1102, the base station allocates resources for V2X communication.

The base station allocates resources for V2X scheduling information and resources for V2X service.

In step S1103, the base station sends scheduling information.

The base station sends the scheduling information through a DCI format 5 on a PDCCH and uses a dedicated RNTI to mask a CRC of the PDCCH.

Before sending the scheduling information, the base station specifies a time-domain location of the scheduling information through a broadcast message or dedicated RRC signaling.

In step S1104, the OBU detects and receives the scheduling information sent by the base station.

The OBU uses the dedicated RNTI in the time-domain location of the scheduling information to detect the CRC of the PDCCH. If the detection succeeds, the scheduling information is required scheduling information and the OBU reads the scheduling information in the DCI-5.

In step S1105, the OBU sends V2X scheduling information and service data.

This step S1105 is similar to step S904 and differs from step S904 in that the V2X scheduling information here is dynamic scheduling information, i.e., the scheduling information may exist in each subframe where the V2X service is located. The scheduling information must exist in the first subframe in which the V2X service is initially sent. If one V2X service occupies multiple subframes, then it is allowed to send the scheduling information in only the first subframe and specify configuration of subsequent subframes in the scheduling information or to resend configuration information according to the scheduling information and resend the scheduling information in the subsequent subframes.

In step S1106, a target OBU receives the V2X service.

This step S1106 is similar to step S905. It is to be noted that because of dynamic scheduling, the target OBU needs to detect each subframe where the V2X service or scheduling information may be located.

Embodiment 4

Figure 12:
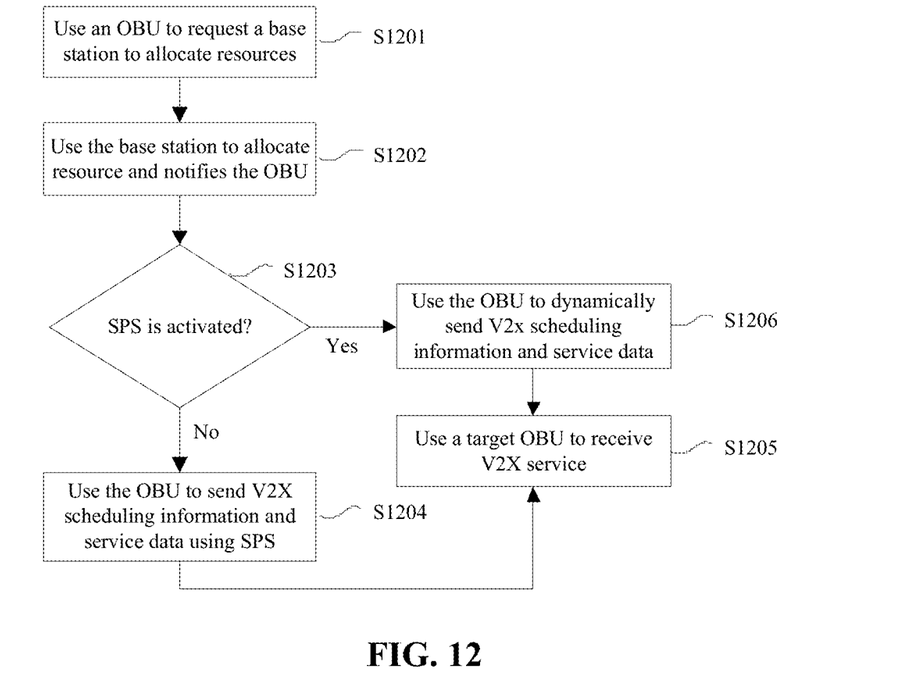
FIG. 12 is a flowchart of a method according to optional embodiment 4 of the present disclosure.

This embodiment is directed to a scenario in which a V2X service is sent using Semi-Persistent Scheduling within a coverage area of an RSU. FIG. 12 is a flowchart of a method according to optional embodiment 4 of the present disclosure. As shown in FIG. 12, the method of this embodiment includes the steps described below.

In step S1201, an OBU requests a base station to allocate resources.

In step S1202, the base station allocates the resources and notifies the OBU.

The base station sends a period of Semi-Persistent Scheduling (SPS) through RRC signaling and sends an activation instruction and SPS resource configuration information through a DCI-5.

In step S1203, the OBU determines whether to activate SPS. If the SPS is to be activated, the method goes to step S1204; otherwise, the method goes to step S1205.

The OBU determines, according to SPS scheduling information in the DCI-5 information sent by the base station, whether to activate the SPS. One or more specific bits may be used in the DCI-5 to notify that the SPS be activated.

In step S1204, the OBU sends V2X scheduling information and service data by using the SPS.

In the case of activated SPS, the OBU sends the V2X scheduling information and the V2X service in the first SPS period according to the instruction of the DCI-5 and, in subsequent SPS periods, sends the V2X service on the same resources for the same service and does not send the scheduling information.

The OBU resends the V2X scheduling information and service data according to the instruction of the base station. The method goes to S1206 and then ends.

In step S1205, a target OBU receives the V2X service.

When the OBU detects the deactivation of SPS, the V2X scheduling information and service data are sent using dynamic scheduling.

In step S1206, the OBU dynamically sends the V2X scheduling information and service data.

Embodiment 5

Figure 13:
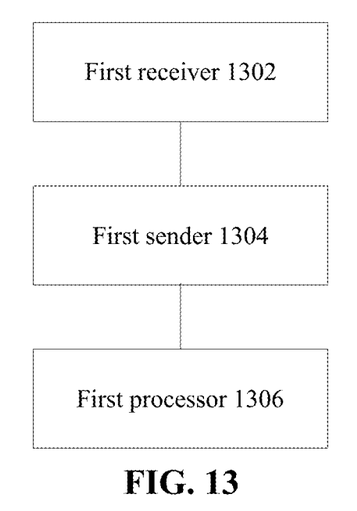
FIG. 13 is a block diagram of a V2X service sending apparatus according to optional embodiment 5 of the present disclosure.

FIG. 13 is a block diagram of an apparatus for sending V2X service according to optional embodiment 5 of the present disclosure. As shown in FIG. 13, the apparatus includes a first receiver 1302, a first sender 1304 and a first processor 1306.

The first receiver 1302 is configured to receive V2X service request information sent by an OBU.

The first sender 1304 is configured to send scheduling information and service resource configuration information to an OBU60 and is further configured to specify the number of transmissions of V2X service to the OBU and to activate/deactivate SPS scheduling.

The first processor 1306 is configured to determine scheduling resources according to the V2X service request of the OBU, and is further configured to select the number of transmissions of V2X service and the time to activate/deactivate SPS scheduling and to use a specific RNTI to scramble a CRC of a DCI-5.

The apparatus may include a base station in LTE or a static UE with an RSU capability.

Embodiment 6

Figure 14:
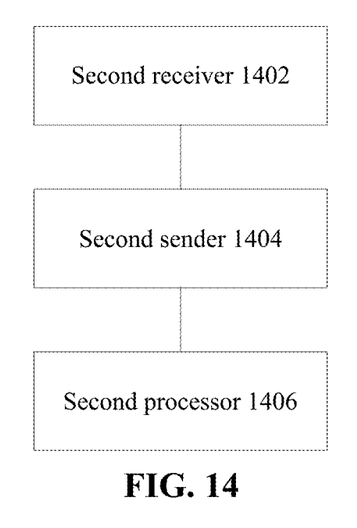
FIG. 14 is a block diagram of a V2X service sending apparatus according to an optional embodiment of the present disclosure.

FIG. 14 is a block diagram of an apparatus for sending V2X service according to an optional embodiment of the present disclosure. As shown in FIG. 14, the apparatus includes a second receiver 1402, a second sender 1404 and a second processor 1406.

The second receiver 1402 is configured to receive V2X resource configuration information sent by a base station and is further configured to receive V2X scheduling information and service data sent by an OBU.

The second sender 1404 is configured to send a V2X service request to the base station and is further configured to send the V2X scheduling information and service data.

The second processor 1406 is configured to select V2X resources and detect V2X scheduling.

The apparatus may include an OBU in LTE or an OBU in DSRC, where the OBU in LTE is a UE or mobile terminal in E-UTRAN.

Embodiments of the present disclosure further provide a storage medium. Optionally, in this embodiment, the storage medium may be configured to store program codes for executing the steps described below.

In step S1, a first OBU acquires sending resources for sending a V2X service.

The sending resources include resources required for sending a V2X service and resources required for sending scheduling information, and the scheduling information is used for specifying information required for resource scheduling for the V2X service.

In step S2, the first OBU sends, on the sending resources, the scheduling information and the V2X service to a second OBU.

Optionally, in this embodiment, the storage medium may include, but are not limited to, a USB flash disk, a read-only memory (ROM), a random access memory (RAM), a mobile hard disk, a magnetic disk, an optical disk or another medium capable of storing program codes.

Optionally, for specific examples in this embodiment, reference may be made to the examples described in the above embodiments and optional embodiments, and the specific examples will not be repeated in this embodiment.

Apparently, those skilled in the art should know that each above-mentioned module or step of the present disclosure may be implemented by a universal computing device, they may be concentrated on a single computing device or distributed in a network formed by multiple computing devices, and alternatively, they may be implemented by program codes executable by the computing devices, so that they may be stored in a storage device for execution by the computing devices, and in some circumstances, the illustrated or described steps may be executed in sequences different from those described herein, or they may be made into various integrated circuit modules separately, or multiple modules or steps therein may be made into a single integrated circuit module for implementation. Therefore, the present disclosure is not limited to any specific combination of hardware and software.

The above are only preferred embodiments of the present disclosure and are not intended to limit the present disclosure, and for those skilled in the art, the present disclosure may have various modifications and variations. Any modifications, equivalent substitutions, improvements and the like made within the spirit and principle of the present disclosure are within the scope of the present disclosure.

INDUSTRIAL APPLICABILITY

Through embodiments of the present disclosure, a first OBU acquires sending resources for sending a V2X service, where the sending resources include resources required for sending V2X service data and scheduling information of the V2X service, the scheduling information is used for specifying information required for resource scheduling for the V2X service data; and the first OBU sends, on the sending resources, the scheduling information and the V2X service data to a second OBU, i.e., sends the scheduling information and the V2X service data simultaneously through the acquired sending resources. The present disclosure enable that resource scheduling information and V2X service data can not only be sent separately in the D2D technology in the related art.

What is claimed is:

1. A method for sending Vehicle-to-Everything service, comprising:
   using a first On-Board Unit (OBU) to acquire sending resources for sending a Vehicle-to-Everything (V2X) service, wherein the sending resources comprise resources required for sending V2X service data and scheduling information of the V2X service, the scheduling information is used for specifying information required for resource scheduling for the V2X service data; and
   using the first OBU to send, on the sending resources, the scheduling information and the V2X service data to a second OBU,
   wherein a frequency-domain multiplexing is performed in a same subframe in the sending resources for the scheduling information and the V2X service data, and the scheduling information specifies that resource configuration is performed, in same and/or different subframes, for the V2X service data;
   wherein when the first OBU is within a coverage area of a Roadside Unit (RSU), the using the first OBU to acquire the sending resources for sending the V2X service comprises:
   using the first OBU to send the RSU a request message for requesting the sending resources, and using the first OBU to receive resource configuration information of the sending resources that is sent by the RSU in response to the request message; or
   using the first OBU to acquire the sending resources from a first sending resource pool preconfigured by the RSU, wherein the sending resources specify resources required for the scheduling information and the V2X service data, and a number of times the scheduling information and the V2X service data are sent in one resource period.

2. The method of claim 1, wherein when the first OBU is within the coverage area of the RSU, the scheduling information and the V2X service data sent by the first OBU are detected by the second OBU according to a preconfigured receiving resource pool and received by the second OBU, wherein after receiving the scheduling information and the V2X service data sent by the first OBU for multiple times, the second OBU merges, according to a predefined rule, the V2X service received for the multiple times.

3. The method of claim 1, wherein when the first OBU is outside a coverage area of an RSU, the using the first OBU to acquire the sending resources for sending the V2X service comprises:
   using the first OBU to select the sending resources from a second sending resource pool preconfigured in the OBU and used for storing the sending resources,
   wherein the sending resources specify resources required for the scheduling information and the V2X service data, and a number of times the scheduling information and the V2X service data are sent in one resource period.

4. The method of claim 3, wherein when the first OBU is outside the coverage area of the RSU, the scheduling information and the V2X service data sent by the first OBU are detected by the second OBU according to a preconfigured receiving resource pool and received by the second OBU, wherein after receiving the scheduling information and the V2X service data sent by the first OBU for multiple times, the second OBU merges, according to a predefined rule, the V2X service received for the multiple times.

5. The method of claim 1, wherein the sending resources further comprise at least one of the following: a number of times the V2X service is sent, a resource period, and a scheduling period of Semi-Persistent Scheduling (SPS).

6. The method of claim 5, wherein resources for the scheduling information comprise time-frequency resources for the scheduling information; and resources for the V2X service data comprise time-frequency resources of the V2X service data and a Modulation and Coding Scheme (MCS) of the V2X service data.

7. The method of claim 6, wherein the scheduling information comprises a time-frequency location of the V2X service, the MCS of the V2X service data, and an identifier of the second OBU; and the V2X service data comprises at least one of the following: a Vehicle-to-Vehicle (V2V) service, a Vehicle-to-Infrastructure (V2I) service, a Vehicle-to-Pedestrian (V2P) service and a Vehicle-to-Network (V2N) service.

8. The method of claim 5, wherein when the scheduling information is SPS information, the using the first OBU to send, on the sending resources, the scheduling information and the V2X service data to the second OBU comprises:
using the first OBU to specify, in a first scheduling period of the SPS information, that the SPS information and the V2X service data are sent to the second OBU, and after the first scheduling period, send the V2X service data according to sending resources specified in the first scheduling period.

9. The method of claim 1, wherein when the scheduling information is dynamic scheduling information, before the using the first OBU to send, on the sending resources, the scheduling information and the V2X service data to the second OBU, the method further comprises:
when the V2X service occupies one subframe, using the first OBU to configure the scheduling information in each subframe where the V2X service data is located; or
when the V2X service occupies a plurality of subframes, using the first OBU to configure the scheduling information in a first subframe or all of the subframes where the V2X service data is located.

10. A method for configuring Vehicle-to-Everything service resources, comprising:
using a Roadside Unit (RSU) to configure resource configuration information of a sending resource pool and a receiving resource pool of a Vehicle-to-Everything (V2X) service; and
using the RSU to configure the resource configuration information for an On-Board Unit (OBU);
wherein when the OBU is within a coverage area of the RSU, the using the RSU to configure the resource configuration information for the OBU comprises:
using the RSU to receive a request message sent by the OBU and used for requesting sending resources; and
using the RSU to send the OBU the resource configuration information of sending resources in response to the request message.

11. The method of claim 10, wherein the sending resources comprise resources required for sending V2X service data and scheduling information of the V2X service, and the scheduling information is used for specifying information required for resource scheduling for the V2X service data.

12. The method of claim 11, wherein the sending resources specify resources required for the scheduling information and the V2X service data, and a number of times the scheduling information and the V2X service data are sent in one resource period.

13. An apparatus for sending Vehicle-to-Everything service, which is applied to a first On-Board Unit (OBU), wherein the apparatus comprises:
an acquisition module, which is configured to acquire sending resources for sending a Vehicle-to-Everything (V2X) service, wherein the sending resources comprise resources required for sending V2X service data and scheduling information of the V2X service, the scheduling information is used for specifying information required for resource scheduling for the V2X service data; and
a first sending module, which is configured to send, on the sending resources, the scheduling information and the V2X service data to a second OBU,
wherein a frequency-domain multiplexing is performed in a same subframe in the sending resources for the scheduling information and the V2X service data, and the scheduling information specifies that resource configuration is performed, in same and/or different subframes, for the V2X service data;
wherein when the first OBU is within a coverage area of a first Roadside Unit (RSU), the acquisition module comprises:
a first sending unit, which is configured to send the RSU a request message for requesting the sending resources, and a first receiving unit, which is configured to receive resource configuration information of the sending resources that is sent by the RSU in response to the request message; or
an acquisition unit, which is configured to acquire the sending resources from a first sending resource pool preconfigured by the RSU,
wherein the sending resources specify resources required for the scheduling information and the V2X service data, and a number of times the scheduling information and the V2X service data are sent in one resource period.

14. The apparatus of claim 13, wherein when the first OBU is within the coverage area of the RSU, the scheduling information and the V2X service data sent by the first OBU are detected by the second OBU according to a receiving resource pool configured by the RSU and received by the second OBU, wherein after receiving the scheduling information and the V2X service data sent by the first OBU for multiple times, the second OBU merges, according to a predefined rule, the V2X service received for the multiple times.

15. The apparatus of claim 13, wherein when the first OBU is outside a coverage area of an RSU, the acquisition module comprises:
a selection unit, which is configured to select the sending resources from a second sending resource pool preconfigured in the OBU and used for storing the sending resources,
wherein the sending resources specify resources required for the scheduling information and the V2X service data, and a number of times the scheduling information and the V2X service data are sent in one resource period,
wherein when the first OBU is outside the coverage area of the RSU, the scheduling information and the V2X service data sent by the first OBU are detected by the second OBU according to a preconfigured receiving resource pool and received by the second OBU, wherein after receiving the scheduling information and the V2X service data sent by the first OBU for multiple times, the second OBU merges, according to a predefined rule, the V2X service received for the multiple times.

16. The apparatus of claim 13, wherein the sending resources further comprise at least one of the following: a number of times the V2X service is sent, a resource period, and a scheduling period of Semi-Persistent Scheduling (SPS),
> wherein resources for the scheduling information comprise time-frequency resources for the scheduling information; and resources for the V2X service data comprise time-frequency resources of the V2X service data and a Modulation and Coding Scheme (MCS) of the V2X service data,
> wherein the scheduling information comprises a time-frequency location of the V2X service, the MCS of the V2X service data, and an identifier of the second OBU; and the V2X service data comprises at least one of the following: a Vehicle-to-Vehicle (V2V) service, a Vehicle-to-Infrastructure (V2I) service, a Vehicle-to-Pedestrian (V2P) service and a Vehicle-to-Network (V2N) service,
> wherein when the scheduling information is SPS information, the first sending module comprises:
> a specifying unit, which is configured to specify, in a first scheduling period of the SPS information, that the SPS information and the V2X service data are sent to the second OBU; and
> a second sending unit, which is configured to, after the first scheduling period, send the V2X service data according to sending resources specified in the first scheduling period.

17. The apparatus of claim 13, wherein when the scheduling information is dynamic scheduling information, before the first OBU sends, on the sending resources, the scheduling information and the V2X service data to the second OBU, the apparatus further comprises:
> a first configuration module, which is configured to, when the V2X service occupies one subframe, configure the scheduling information in each subframe where the V2X service data is located; or
> a second configuration module, which is configured to, when the V2X service occupies a plurality of subframes, configure the scheduling information in a first subframe or all of the subframes where the V2X service data is located.

* * * * *